US009931966B2

(12) United States Patent
Jacquemont et al.

(10) Patent No.: US 9,931,966 B2
(45) Date of Patent: Apr. 3, 2018

(54) DEVICE FOR RAPID REMOVAL/REINSTALLATION OF A VEHICLE SEAT BACK, AND SEAT ASSEMBLY COMPRISING THE SAME

(71) Applicant: NEXTER SYSTEMS, Roanne (FR)

(72) Inventors: Jacky Jacquemont, Bourges (FR); Xavier Poirmeur, Bourges (FR)

(73) Assignee: NEXTER SYSTEMS, Roanne (FR)

( * ) Notice: Subject to any disclaimer, the term of this patent is extended or adjusted under 35 U.S.C. 154(b) by 0 days.

(21) Appl. No.: 15/318,292

(22) PCT Filed: Jun. 12, 2015

(86) PCT No.: PCT/FR2015/051561
§ 371 (c)(1),
(2) Date: Dec. 12, 2016

(87) PCT Pub. No.: WO2015/189528
PCT Pub. Date: Dec. 17, 2015

(65) Prior Publication Data
US 2017/0120780 A1    May 4, 2017

(30) Foreign Application Priority Data

Jun. 12, 2014    (FR) .................................... 14 01335

(51) Int. Cl.
*B60N 2/02*    (2006.01)
*B60N 2/24*    (2006.01)
(Continued)

(52) U.S. Cl.
CPC ............. *B60N 2/24* (2013.01); *B60N 2/3097* (2013.01); *B60N 2/4207* (2013.01);
(Continued)

(58) Field of Classification Search
CPC .......... B60R 7/043; B62K 19/46; B62J 15/00; B62J 1/12; B62J 7/04; H01L 2924/00014;
(Continued)

(56) References Cited

U.S. PATENT DOCUMENTS 4,782,918 A * 11/1988 Brunner ................ A01M 31/02
108/152
6,367,585 B1 * 4/2002 Fast ....................... A01M 31/02
182/135

(Continued)

FOREIGN PATENT DOCUMENTS

EP    2 103 478 A2    9/2009
EP    2 127 940 A2    12/2009
EP    2 208 635 A1    7/2010

OTHER PUBLICATIONS

Mar. 5, 2015 Search Report issued in French Patent Application No. 1401335.
(Continued)

*Primary Examiner* — Kiran B Patel
(74) *Attorney, Agent, or Firm* — Oliff PLC

(57) ABSTRACT

A device for rapid removal/reinstallation of a back of a seat of a vehicle, the back being attached, by at least one first strap, to a ceiling. The device includes a hanging intermediary structure and a fixed structure integral with the ceiling and retaining the structure in the use position of the seat, in which it has been brought with an upward movement, and locking the structure in the use position or unlocking it such that it is moved away from the ceiling to release the tension exerted by the first strap and allow the structure to be disengaged from the retaining unit. The back can thus be removed or reinstalled without any action on the tension setting of the strap.

13 Claims, 4 Drawing Sheets

(51) Int. Cl.
    *B60R 22/26*     (2006.01)
    *B60R 22/12*     (2006.01)
    *B60N 2/44*     (2006.01)
    *B60N 2/42*     (2006.01)
    *B60N 2/30*     (2006.01)
    *B60N 2/64*     (2006.01)
    *F41H 7/00*     (2006.01)

(52) U.S. Cl.
    CPC ........... *B60N 2/4242* (2013.01); *B60N 2/442* (2013.01); *B60N 2/64* (2013.01); *B60R 22/12* (2013.01); *B60R 22/26* (2013.01); *F41H 7/00* (2013.01); *B60N 2002/4455* (2013.01)

(58) Field of Classification Search
    CPC . H01L 2224/45144; F01D 5/141; F03D 1/04; F03D 1/0641
    See application file for complete search history.

(56) References Cited

U.S. PATENT DOCUMENTS

| | | | |
|---|---|---|---|
| 6,510,567 B1 * | 1/2003 | Robbins | A61G 5/08 280/304.1 |
| 9,027,709 B2 * | 5/2015 | Wheelington | A01M 31/02 182/129 |
| 9,132,753 B1 * | 9/2015 | Campbell | B60N 2/42709 |
| 9,221,361 B1 * | 12/2015 | Platt | B60N 2/163 |
| 9,494,390 B2 * | 11/2016 | Berman | B60N 2/4242 |
| 9,797,692 B2 * | 10/2017 | Berman | F41H 7/046 |
| 2005/0264082 A1 * | 12/2005 | Kumpf | B60N 2/015 297/452.1 |
| 2008/0231068 A1 * | 9/2008 | Elhanany | B60N 2/24 296/63 |
| 2013/0152775 A1 * | 6/2013 | Jessup | B60N 2/24 89/36.08 |
| 2013/0169020 A1 | 7/2013 | Raz et al. | |
| 2013/0214570 A1 * | 8/2013 | Grant | B60N 2/24 297/216.1 |

OTHER PUBLICATIONS

Mar. 5, 2015 Written Opinion issued in French Patent Application No. 1401335.

Oct. 9, 2015 International Search Report issued in International Patent Application No. PCT/FR2015/051561.

Oct. 9, 2015 Written Opinion of the International Searching Authority issued in International Patent Application No. PCT/FR2015/051561.

* cited by examiner

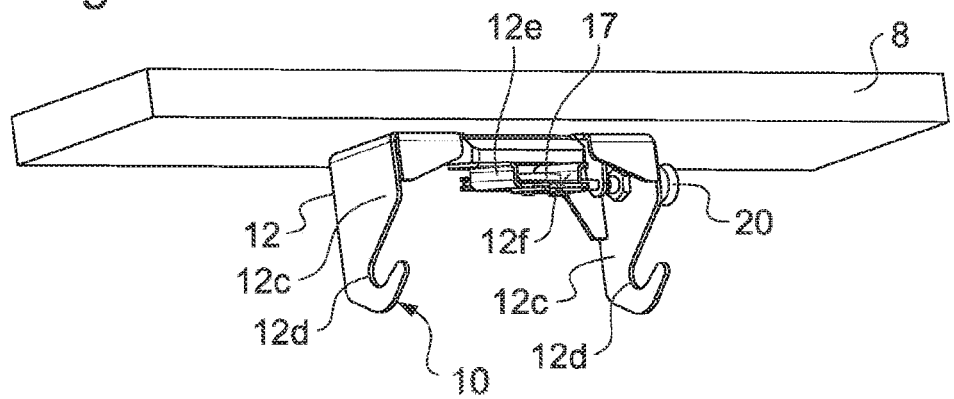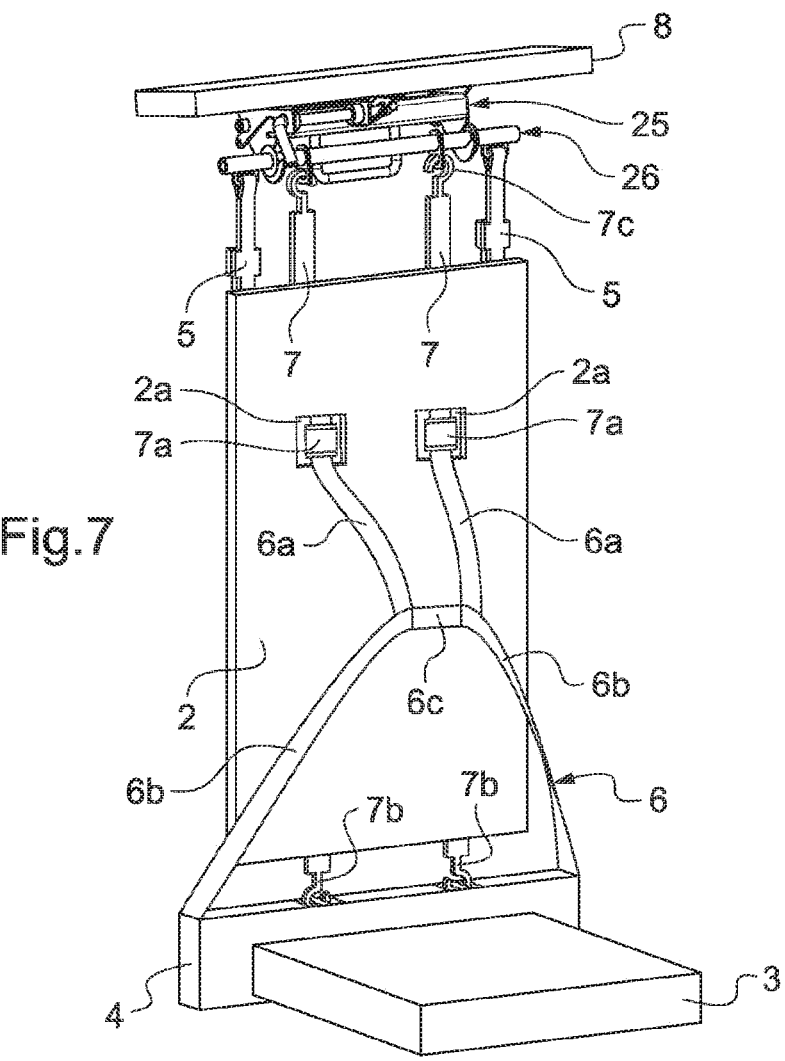

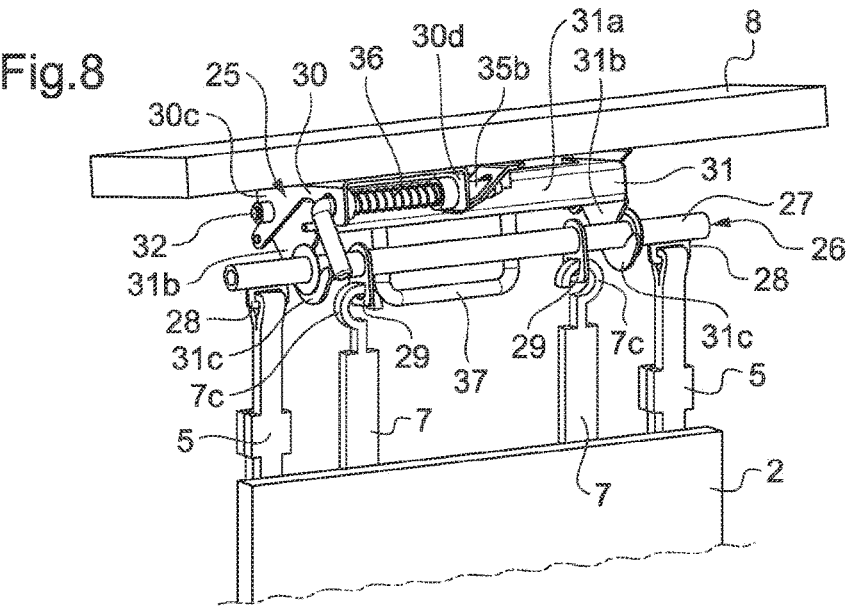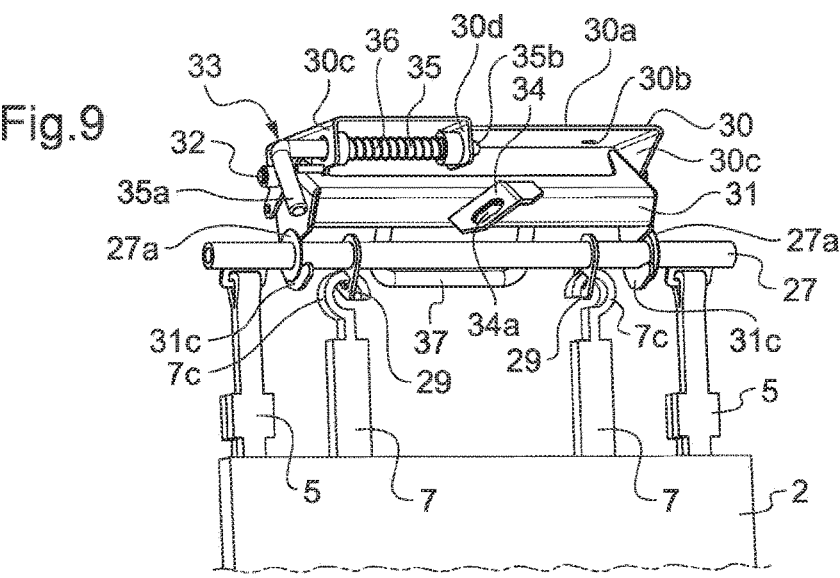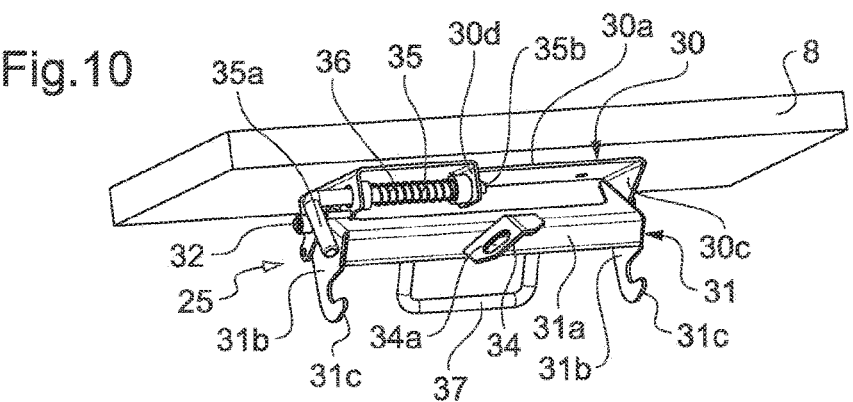

DEVICE FOR RAPID REMOVAL/REINSTALLATION OF A VEHICLE SEAT BACK, AND SEAT ASSEMBLY COMPRISING THE SAME

The present invention relates to the field of seats for vehicles, namely seats for armoured vehicles, and relates particularly to a device for rapid removal/reinstallation of a seat back, and optionally also a harness, and to a seat assembly comprising this device.

The support and regulatory requirements in case of IED (Improvised Explosive Devices) threats (lateral and under the floor) required to add harness-type belts to the seats of armoured vehicles. Furthermore, the armoured vehicles must be provided with seats ensuring a safe sitting position but, at the same time, occupying a reduced volume in the passenger compartment.

It is known to provide armoured vehicles with seats the back of which is foldable.

However, such seats have an excessive size and do not allow an easy access to passenger compartment areas located behind the seat back.

In order to facilitate the access to equipment located behind the seat back, European patent EP 2 208 635 suggests a seat with a flexible back removable from the vehicle ceiling.

This seat has a flexible back attached between a seating part integral with the structure of the vehicle and a profile which has been made permanently integral with the structure, at the vicinity of a vehicle ceiling, the back being removably attached at the profile by hooks connected to the back by first straps for adjusting the tension of the back.

A harness comprising a lap strap and two shoulder straps is further provided. Each shoulder strap passes, with passing through a hole of the back, through a fixed loop positioned to the rear of the back, the end of each shoulder strap being made integral with the structure of the vehicle. In addition, both fixed loops are integral with length-adjustable second flexible straps attached, at the bottom, to the structure of the vehicle and, at the top, in a removable manner, to said profile by snaps.

Thus, in order to remove the seat back, it is required beforehand to loosen said first and second straps, and then to unhook the same from the profile. One understands that the reinstallation requires to retighten each strap.

Therefore, although such a seat allows to remove the back easily, the removal and reinstallation of the back require to act on the tension of each strap.

European patent application EP 2 127 940 A2 is another example of a seat the flexible back of which is hung to the ceiling by straps, the tension of which is adjustable, and held tightened by tightening said straps, but the reinstallation of which requires to release and re-tighten the straps. Indeed, said straps are hooked to the back via tab-type hooking buckles. Avoiding the action on the tension of the straps would suppose that the user can himself/herself tighten directly the back to a tension corresponding to that of the back when tightened. Obviously, even supposing that the user can sufficiently tighten the back, which will not be the case in practice, that he has to apply such an effort is contrary to the aim of an easy and rapid removal/reinstallation of the back.

It is mentioned here that hanging a seat to a ceiling by straps is known here, if applicable with means dedicated to shock absorption, for example by patent applications EP 2 103 478 A2, US 2013/152775 A1 and US 2013/169020 A1.

The present invention is intended to solve the problems mentioned above and thus to provide a solution with which the back and the associated harness are removed and reinstalled rapidly and easily, without acting on the tension of the plurality of straps.

According to the present invention, such a solution consists in arranging, between, on one hand, the ceiling and, on the other hand, the back and the harness, a device comprising a hanging intermediary structure to which the plurality of straps can be connected, which hanging intermediary structure can be hung to a fixed structure while the back and the harness do not apply any tension thereon, and which can then be moved by an upward movement to a position in which the seat can be used and locked in this position.

This solution can be applied to the removal/reinstallation of only the back of a seat, in case where no harness is provided.

The present invention thus relates to a device for rapid removal/reinstallation of a back of a vehicle seat, the seat comprising a seating part, integral with a structure of the vehicle, and a back which is attached, in the use position of the seat, and via at least one first strap, between the seating part and one or more first high attachment points to a ceiling of the vehicle, said first strap(s) being adjustable in tension and being, in the use position of the seat, tightened so as to maintain in position the back, the device being characterized in that it comprises a hanging intermediary structure, provided with means for connecting to said first strap(s), and a fixed structure which is integral with the ceiling of the vehicle and forms said first high attachment point(s), the fixed structure comprising for this purpose:

retaining means for removably connecting the hanging intermediary structure to the fixed structure and for supporting the hanging intermediary structure in the use position of the seat, position in which the hanging intermediary structure has been brought with a movement towards the ceiling so as to put under tension the hanging intermediary structure thanks to the tension of the first strap(s); and locking means for, in a first position, locking the hanging intermediary structure in the use position of the seat and for, in a second position, unlocking the hanging intermediary structure such that the latter is moved away from the ceiling so as to release the tension applied by the first strap(s) on the hanging intermediary structure and thus allow the hanging intermediary structure to be disengaged from the retaining means, the latter being configured to support the hanging intermediary structure during said movement away from the ceiling, whereby the back can thus be removed or reinstalled without any action on the tension setting of said first strap(s).

In the case where several first straps are provided, the above configuration of the hanging intermediary structure and of the fixed structure allows to tighten the first straps, and thus the back, in an easier manner as only the hanging intermediary structure needs to be moved upwards, and not each strap in an isolated manner as in patent EP 2 127 940 A2. The operation can thus be done with only one hand.

Preferably, the device is intended to a rapid removal/reinstallation of a back of a vehicle seat and a harness provided to the seat, the harness comprising at least two shoulder straps, each cooperating with a second strap extending between a low attachment point integral with the structure of the vehicle or the seating part of the seat and, in the use position of the seat, a second high attachment point to the ceiling of the vehicle, said second strap(s) being adjustable in tension and being, in the use position of the seat, tightened so as to allow to maintain the occupant of the seat against the back by both shoulder straps, the device being characterized in that the hanging intermediary structure is also provided with means for connecting to said second straps.

According to a first embodiment, the retaining means are formed by fixed hooks having openings which have bottoms which follow a same imaginary cylinder, and the hanging intermediary structure has at least one cylindrical bar able to be received within the hooks so as to be rotatable around the longitudinal axis of the at least one bar, the hanging intermediary structure thus being able to pivot upwards or downwards around the rotation axis of the at least one bar.

The hanging intermediary structure is thus able to be hung to the fixed structure by engaging the at least one bar within the hooks, and then to be brought to the use position of the seat by pivoting the hanging intermediary structure upwards to the use position of the seat, the upward pivoting movement arranging under tension the hanging intermediary structure while the downward pivoting movement of the hanging intermediary structure, allowed by the locking means when they are in their second position, allows to release the tension exerted by the first and, if applicable, second straps.

Preferably, the center of inertia of the hanging intermediary structure is offset, with respect to the rotation axis of the at least one bar, on the seating part side with respect to the plane of the back in the use position of the seat.

The hanging intermediary structure can comprise two handles connected by a connecting central bar and each handle carrying means for attaching a first strap and, if applicable, a second strap, and a cylindrical bar able to be received within one of the fixed hooks.

According to a second embodiment, the fixed structure has a fixed support integral with the ceiling of the vehicle, the retaining means are formed by movable hooks connected to the fixed support so as to be able to pivot around a horizontal pivot axis, the openings of the hooks having bottoms which follow a same imaginary cylinder, and the hanging intermediary structure has at least one cylindrical bar able to be received within the hooks, the hanging intermediary structure thus being able, after engaging the at least one bar within the hooks, to be moved to the use position of the seat by pivoting upwards or downwards the movable hooks.

Preferably, the center of inertia of the assembly formed by the movable hooks and the hanging intermediary structure, when the at least one bar is engaged within the hooks, is, with respect to the pivot axis of the hooks, offset on the seating part side with respect to the plane of the back in the use position of the seat.

Preferably, the locking means comprise a locking member movable between said first and second positions of the locking means and means for elastically biasing the locking member towards the first position, and the hanging intermediary structure carries a cooperating member arranged to move the locking member from said first position to said second position when the hanging intermediary structure is in the use position of the seat by a movement towards the ceiling.

The locking means can advantageously comprise an unlocking control handle manually operable to move the locking member from the first position to the second position.

In the first embodiment, the cooperating member can consist in a locking finger extending from the connecting central bar, and the fixed structure has a notch able to receive the locking finger when the hanging intermediary structure is in the use position of the seat, the locking member being a pivoting latch having an oblique outer surface oriented such that the locking finger pivots the latch to the second position when it presses the oblique surface when the hanging intermediary structure reaches the use position of the seat.

In the second embodiment, the locking member can be formed by a locking finger carried, by the fixed support, so as to be able to translate in a direction parallel to the pivot axis of the movable hooks, and the movable hooks are integrally connected to each other by a connecting central part carrying a leg which is sloped while being oriented upwards and towards the locking finger, a through hole being provided in the leg for letting the locking finger pass, said leg forming the cooperating member and its slope being such that the leg moves the locking finger in translation towards the second position when it presses the sloped leg when the hanging intermediary structure reaches the use position of the seat.

The present invention also relates to a seat assembly for a vehicle, the seat assembly comprising a seat and attachment points for attaching the seat to a ceiling of the vehicle, the seat comprising a seating part, integral with a structure of the vehicle, and a back, preferably flexible, which is attached, in the use position of the seat, and via at least one first strap, between the seating part and a first high attachment point to a ceiling of the vehicle, the seat being, preferably, provided with a harness comprising at least two shoulder straps, each cooperating with a second strap extending between a low attachment point integral with the structure of the vehicle and, in the use position of the seat, a second high attachment point to the ceiling of the vehicle, said first strap(s) and, if applicable, said second strap(s), being adjustable in tension and being, in the use position of the seat, tightened so as to respectively maintain in position the back and allow to maintain the occupant of the seat against the back by both shoulder straps, the seat assembly being characterized in that it comprises a device for rapid removal/reinstallation as defined above.

To better illustrate the subject-matter of the present invention, two particular embodiments will be described below, with reference to the appended drawings.

Figure 4:
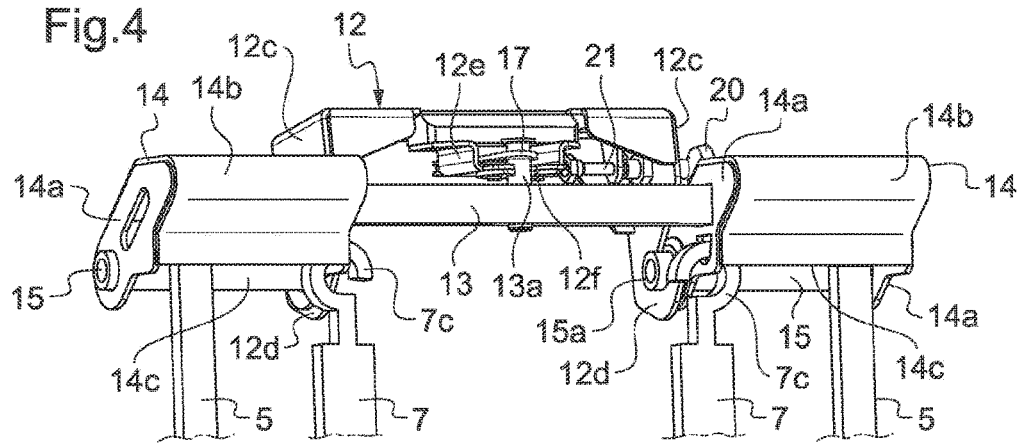
Figure 5:
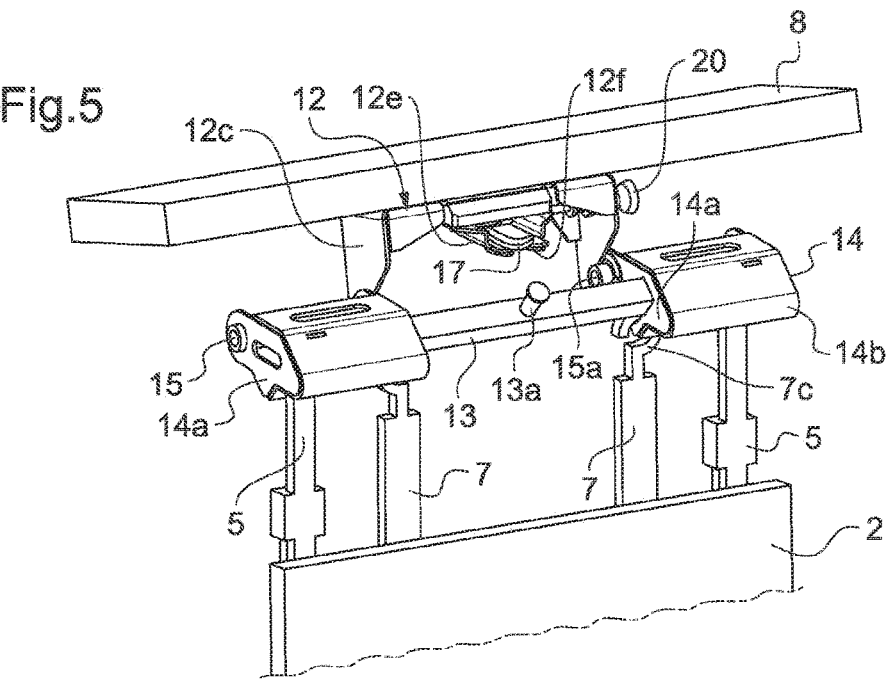

FIG. 4 according to the first embodiment of the invention, in locked position, the upper part of the different straps having been shown;

FIG. 5 is a front-side top perspective view of the device according to the first embodiment of the invention, in unlocked position, before the hanging intermediary structure is unhooked;

FIG. 6 is a bottom front-side perspective view of the fixed structure of the device according to the first embodiment of the invention;

FIG. 7 is a global perspective view of a seat of an armoured vehicle provided with the device for removal/reinstallation of the back according to a second embodiment of the invention, the back being in use position;

FIGS. 8 and 9 are front-side perspective views of the device according to the second embodiment of the invention, in locked and unlocked positions, respectively; and FIG. 10 is a front-side perspective view of the fixed structure of the device according to the second embodiment of the invention.

If referring to FIGS. 1 to 10, a rapid removal/reinstallation device is shown according to first and second embodiments of the present invention, equipping a seat 1 which comprises a flexible back 2, for example made of cloth or synthetic material, and a seating part 3 integral with a profile 4 which is integral with the structure of the vehicle. The seating part 3 could be mounted in a swinging manner with respect to the profile 4.

The back 2 is, in a low part, integral with the seating part 3 and carries, in an upper part, two first straps 5, preferably with an adjustable length. The back 2 has two holes 2a, each for passing a shoulder strap 6a of a harness 6, the shoulder straps 6a cooperating, via two fixed loops 7a, with two second length-adjustable straps 7 which extend from the profile 4, to which they are attached, here in a removable manner by hooks 7b, to the vicinity of a ceiling 8 of the vehicle, only part of the ceiling 8 being shown. It would also be possible to mount the straps 7 in a fixed manner at the profile 4. The harness 6 also has a lap strap 6b which closes by a clip 6c to which the shoulder straps 6a are also attached.

The connection of the harness 6 and the second straps 7 is based on the principle disclosed in European patent EP 2 208 635, to which reference can be made for a more detailed description of the harness 6, the fixed loops 7a and the second straps 7.

Generally, the embodiments shown here differ from European patent EP 2 208 635 by the rapid removal/reinstallation device arranged between, on one hand, the first and second straps 5,7 and, on the other hand, the ceiling 8.

If referring first to FIGS. 1 to 5, it can be noted that the rapid removal/reinstallation device 9 according to the first embodiment of the present invention comprises a fixed structure 10 and a hanging intermediary structure 11.

The fixed structure 10 has a support 12 formed by a generally U-shaped metal sheet the opening of which is oriented downwards and the bottom of which is applied by its outer face 12a against the ceiling 8 and attached to the latter by any suitable means, for example by screwing through the holes 12b provided for this purpose. Both wings 12c of the U-shaped metal sheet 10 are perpendicular to the plane of the back 2 in the position of use of the latter. The lower part of each wing 12c forms a cylindrical-bottomed hook 12d the opening of which is oriented towards the ceiling 8, here on the seating part 3 side with respect to the plane of the back 2 in use position. The hooks 12d form the retaining means for retaining the hanging intermediary structure 11.

On the inner face of the bottom of the support 12, substantially centered in the longitudinal direction of the support 12, is attached a locking support piece 12e, also generally U-shaped, so as to form a free space between said inner face of the support 12 and the bottom of the piece 12e. A notch 12f, the function of which will be explained below, is provided in the center of the edge of the piece 12e, on the hook 12d side.

The hanging intermediary structure 11 has a connecting central bar 13 each end of which is integral with a handle 14.

The bar 13, having a square cross-section, carries, in the center in the longitudinal direction thereof, a locking finger 13a in the form of a cylindrical block extending perpendicularly to a face of the bar 13.

Each handle 14 is in the form of a semi-open shell consisting in two wings 14a, perpendicular to the longitudinal direction of the bar 13 and to one of which the bar 13 is attached, and a handling part-forming metal sheet 14b extending between both wings 14a, for each wing 14a from a point of an edge of a wing 14a to a point on the opposed edge of said wing 14a so as to form an inner space to which an individual's hand can access by an opening 14c.

In each wing 14a, to which the bar 13 is attached, is provided a hole 14d for hanging a hook 7c to the upper end of each second strap 7. The upper end of each first strap 5 is also attached in the inner space of a handle 14 by connection to a leg, as will be described in the second embodiment.

Thus, the hanging intermediary structure 11 is integral with the back 2, via the first straps 5, and the harness 6, via the second straps 7. The hanging intermediary structure 11, back 2 and harness 6 assembly can be handled using at least one of the handles 14.

Figure 1:
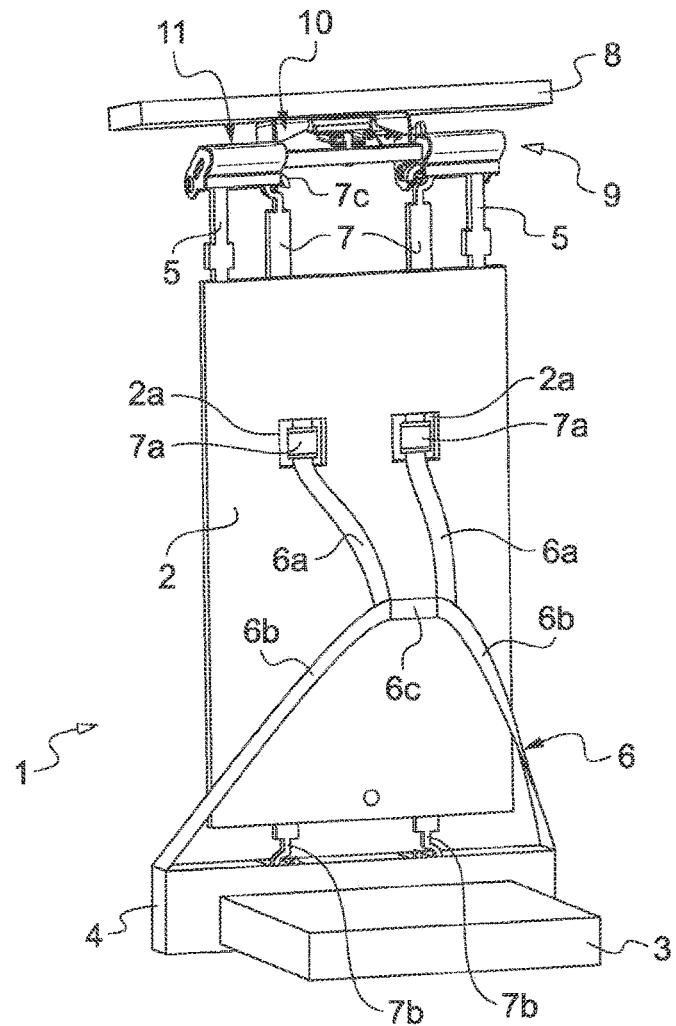
FIG. 1 is a global perspective view of a seat of an armoured vehicle provided with the device for removal/reinstallation of the back according to a first embodiment of the invention, the back being in the use position.
Figure 2:
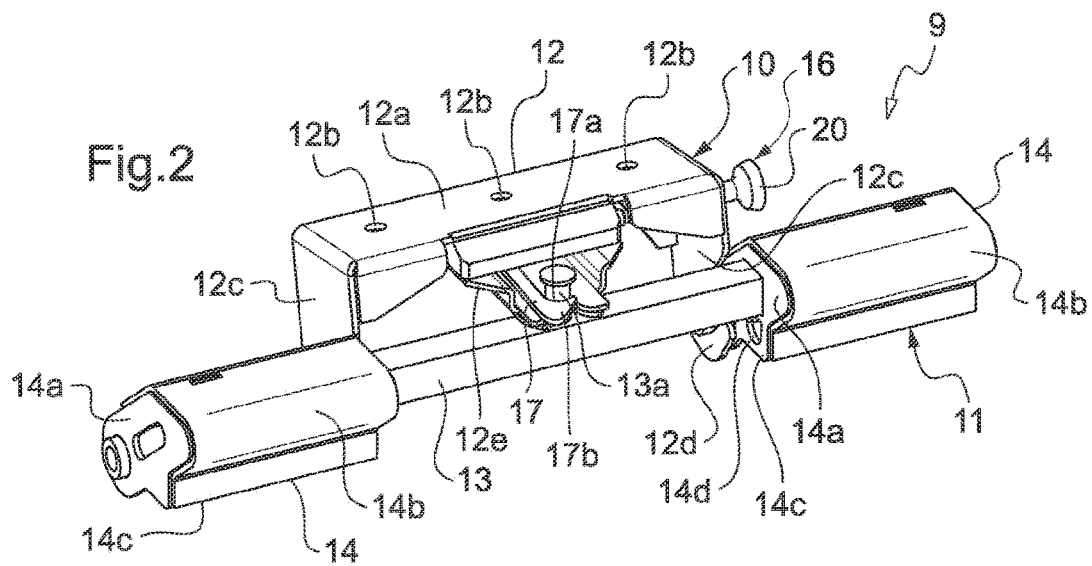
FIGS. 2 and 3 are top perspective views, respectively on the front side and rear side, of the device according to the first embodiment of the invention, in locked position.
Figure 3:
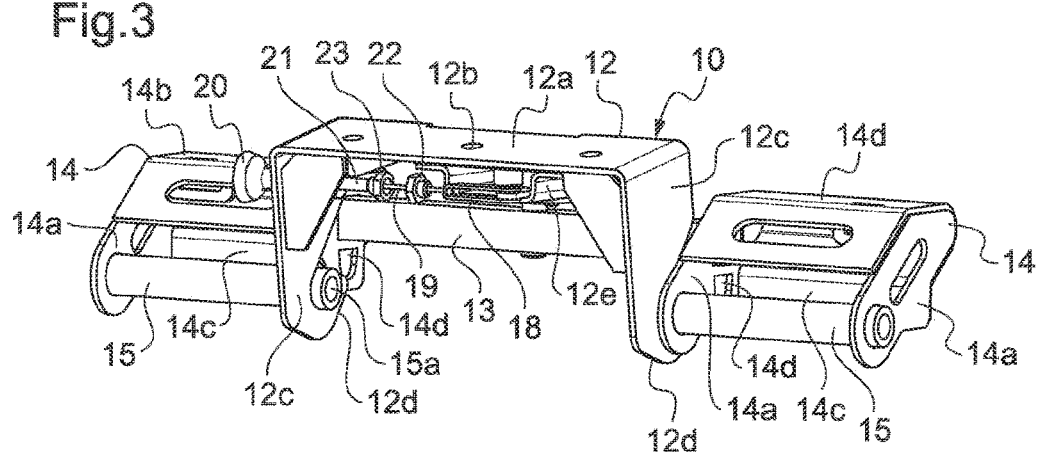

If referring particularly to FIG. 3, it can be noted that a hooking cylindrical bar 15 extends between both wings 14a of a same handle 14, on the opposite side to the handle part 14b, a part 15a of each bar 15 protruding on the wing 14a which faces the other handle 14.

The bars 15, on one hand, are coaxial to each other and parallel to the central bar 13 and, on the other hand, have a diameter allowing their protruding part 15a to be received within the hooks 12d so as to be rotatable around a rotation axis coaxial to the longitudinal directions of the bars 15, the spacing between both inner wings 14a of both handles 14 being slightly greater than the spacing between both wings 12c of the support 12.

In other words, when the hanging intermediary structure 11 is hung to the structure 10 by engaging the bars 15 within the hooks 12d, the hanging intermediary structure 11 can pivot upwards or downwards around a pivot axis formed by the axis of the bars 15.

Furthermore, the hanging intermediary structure is configured and sized such that it can be pivoted upwards around said pivot axis to a locking position in which the locking finger 13a is received within the notch 12f. This locking position corresponds to the use position of the seat 1, the straps 5 and 7 having been set to apply a tension on the hanging intermediary structure 11.

The hanging intermediary structure 11 is locked in this position by pivoting latch-type locking means 16, comprising a latch 17, a fork 18, a control rod 19 and an unlocking control handle 20.

The latch 17 extends along a side of the piece 12e and is hinged, in a median part thereof, on the bottom of the piece 12e so as to be able to pivot around a pivot axis perpendicular to said bottom, a first end of the latch ending as a hook 17a the inner contour of which is concave and the outer contour of which forms an oblique surface 17b oriented towards the opposite side of the piece 12e, the second end of the latch 17 being hinged to the fork 18 with a pivot axis parallel to the pivot axis mentioned above. The latch 17 is pivotably mounted against the action of a return spring (not shown, for example a torsion spring mounted around the axis of the latch). The return spring has the effect of bringing the latch 17 back in its locking position, engaged within the notch 12f.

The control rod 19 passes through a wing 12c by passing through a sheath 21 integral with the support 12 and is connected at an end to the fork 18 and at the other end to the handle 20. The handle 20 is elastically biased, for example by the return spring of the latch, to a position in which a stop piece 22 integral with the control rod 19 is at a distance from a stop piece 23 integral with the sheath 21. In this position, the hook 17a extends through the notch 12f, at the entry thereof, so as to prevent the locking finger 13a from exiting.

When pulling on the handle 20, against the elastic solicitation, the latch 17 is caused, under the action of the fork 18 and the rod 19, to pivot outwardly such that the hook 17a is disengaged from the notch 12f. The exit movement of the handle 20 is limited by the stop piece 22 coming to abut against the stop piece 23.

Obviously, the latch 17 can also be arranged on the other side of the locking finger 13a, such that it is disengaged from the notch 12f by pushing on the handle 20. In this case, in the locking position, the stop piece 22 abuts against the stop piece 23, the latter thus allowing to stop the pivoting movement of the latch 27 under the action of the associated return spring.

It can be noted that the hanging intermediary structure 11 is configured such that its center of gravity is forwardly of the axis of the bars 15, in other words on the seating part 3 side with respect to the plane of the back 2 in the position of use. This is mainly obtained by the fact that the central bar 13 is arranged forwardly of the bars 15.

Thus, when one wishes to remove the back 2 and the harness 6, it is just necessary to pull on the handle 20 to unlock the latch 17 which releases the locking finger 13a, the hanging intermediary structure 11 automatically pivoting downwards under the action of its own weight and that of the back 2 and the harness 6 (as well as the initial tension), thereby lowering the back 2 and releasing the tension of the straps 5 and 7 without acting on their tension setting. The latch 17 is brought back in position by elastic solicitation and the hanging intermediary structure 11 is then in an unlocked position (FIG. 5) in which the bars 15 can be disengaged from the hooks 12d using the handles 14 and the back 2 and the harness 6 can thus be removed.

When one wishes to reinstall the back 2 and the harness 6 in the use position of the seat 1, it is just necessary to hang the hanging intermediary structure 11 by engaging the bars 15 within the hooks 12d, and then pivot it upwards until the locking finger 13a enters into contact with the oblique surface 17b the orientation of which allows the locking finger 13a to pivot the latch 17 out of the notch 12f.

Once the locking finger 13a is within the notch 12f, the latch 17 is automatically brought back across the notch 12f by the associated return spring and the hanging intermediary structure 11 is locked in the use position of the seat 1, with the straps 5 and 7 being tightened.

A removal/reinstallation device 24 according to a second embodiment of the present invention will now be described with reference to FIGS. 7 to 10. The device 24 is arranged between the seat 1 such as described above and the ceiling 8 of the vehicle and also comprises a fixed structure 25 and a hanging intermediary structure 26.

The hanging intermediary structure 26 consists in a cylindrical bar 27 carrying, at each end, a first leg 28 to which a first strap 5 is connected and a second leg 29 to which the hook 7c of a second strap 7 is hung, the hanging intermediary structure 26 thus forming, together with the back 2 and the harness 6, an assembly that can be handle as a one-piece assembly.

The fixed structure 25 has a fixed support 30 and a hanging movable support 31.

The fixed support 30 is formed by a generally U-shaped metal sheet the opening of which is oriented downwards and the bottom of which is applied by its outer face 30a against the ceiling 8 and attached to the latter by screws through the holes 30b, both wings 30c being perpendicular to the plane of the back 2.

The movable support 31 is formed by a steel-strip central part 31a at each end of which a wing 31b extends downwards, the lower part of which forms a cylindrical-bottomed hook 31c the opening of which is oriented towards the ceiling 8, on the seating part 3 side with respect to the plane of the back 2 in the position of use.

The movable support 31 is pivotably carried by the support 30 via a pivot link 32 between each wing 30c and the corresponding wing 31b.

The movable support 31 can thus be arranged in a locking position (FIGS. 7 and 8), in which the hanging intermediary structure 26 is hung to the movable support 31 by engaging the bar 27 within the hooks 31c, with stopping in translation by washers 27a integral with the bar 27. In this locking position, the movable support 31 has been pivoted upwards until the back 2 and the harness 6 are in the position of use, with the straps 5 and 7 being tightened. In the locking position, the hanging intermediary structure 26 is locked by locking in position the movable support 31 to the fixed support by locking means 33.

The locking means 33 are formed by a leg 34 integral with the central part 31a, on the front side, and by a locking finger 35 carried by the fixed support 30. The leg 34 is sloped while being oriented upwards and towards the locking finger 35. A through hole 34a is provided in the leg 34 for letting the finger 35 pass. The finger 35 is in the form of a rod one end of which is bent at 90° so as to form an operating handle 35a, the rod being guided in translation by passing through the wing 30c and a leg 30d. The translation direction is parallel to the pivot axis of the movable support 31. A spring 36 is mounted between the wing 30c and the leg 30d and permanently biases the finger 35 to the extended position, in which the other end 35b of the finger 35 extends through the through hole 34a of the leg 34, thereby preventing the movable support 31 from pivoting downwards.

It is noted here that the movable support 31 is configured such that its center of gravity is forwardly of the axis of the pivot links 32.

Thus, when one wishes to remove the back 2 and the harness 6, it is just necessary to pull on the locking finger 35 towards the outside using the operating handle 35a, against the action of the spring 36, until disengaging the locking finger 35 from the leg 34. The movable support 31 then automatically pivots downwards under the action of its own weight and that of the hanging intermediary structure 26, the back 2 and the harness 6. As a result, this lowers the hooks 31c, thus the back 2, and releases the tension of the straps 5 and 7 without acting on their tension setting. Although the locking finger 35 is shown in FIGS. 9 and 10 in retracted position, so as to illustrate this position, the locking finger 35 is brought back in extended position by the spring 36.

Once the leg 34 is unlocked, the hanging intermediary structure 26 then is in an unlocked position (FIG. 9) in which the bar 27 can be disengaged from the hooks 31c and the back 2 and the harness 6 can thus be removed.

When one wishes to reinstall the back 2 and the harness 6 in the use position of the seat 1, it is just necessary to hang the hanging intermediary structure 26 by engaging the bar 27 within the hooks 31c, and then to pivot the movable support 31 upwards, using a handle 37 integral with the central part 31a, until the leg 34 comes into contact with the end 35b of the locking finger 35. Due to the slope of the leg 34, the latter pushes the finger 35 against the spring 36, until the locking finger 35 can pass through the hole 34a under the action of the spring 36. Once it is in this position, the movable support 31 is locked again in position and the hanging intermediary structure 26 is locked in the use position of the seat 1, with the straps 5 and 7 being tightened.

The removal/reinstallation devices 9 and 24 thus allow to remove and reinstall the back 2 and the harness 6 in an easy and rapid manner, without any action on the setting of the straps 5 and 7, with a single-hand locking control and an automatic locking in the use position.

It is of course understood that the preceding embodiments of the present invention are for information and non-limiting purpose, and that modifications could be made without departing from the scope of the present invention.

The invention claimed is:

1. A device for rapid removal/reinstallation of a back of a vehicle seat, the seat comprising a seating part, integral with a structure of the vehicle, and a back which is attached, in the use position of the seat, and via at least one first strap, between the seating part and one or more first high attachment points to a ceiling of the vehicle, said first strap(s) being adjustable in tension and being, in the use position of the seat, tightened so as to maintain in position the back, wherein the device comprises a hanging intermediary structure, provided with means for connecting to said first strap(s), and a fixed structure which is integral with the ceiling of the vehicle and forms said first high attachment point(s), the fixed structure comprising for this purpose:
   retaining means for removably connecting the hanging intermediary structure to the fixed structure and for supporting the hanging intermediary structure in the use position of the seat, position in which the hanging intermediary structure has been brought with a movement towards the ceiling so as to put under tension the hanging intermediary structure thanks to the tension of the first strap(s); and
   locking means for, in a first position, locking the hanging intermediary structure in the use position of the seat and for, in a second position, unlocking the hanging intermediary structure such that the latter is moved away from the ceiling so as to release the tension applied by the first strap(s) on the hanging intermediary structure and thus allow the hanging intermediary structure to be disengaged from the retaining means, the latter being configured to support the hanging intermediary structure during said movement away from the ceiling,
   whereby the back can thus be removed or reinstalled without any action on the tension setting of said first strap(s).

2. The device according to claim 1, intended to a rapid removal/reinstallation of a back of a vehicle seat and a harness provided to the seat, the harness comprising at least two shoulder straps, each cooperating with a second strap extending between a low attachment point integral with the structure of the vehicle and, in the use position of the seat, a second high attachment point to the ceiling of the vehicle, said second strap(s) being adjustable in tension and being, in the use position of the seat, tightened so as to allow to maintain the occupant of the seat against the back by both shoulder straps, wherein the hanging intermediary structure is also provided with means for connecting to said second straps.

3. The device according to claim 1, wherein the retaining means are formed by fixed hooks having openings which have bottoms which follow a same imaginary cylinder, and wherein the hanging intermediary structure has at least one cylindrical bar able to be received within the hooks so as to be rotatable around the longitudinal axis of the at least one bar, the hanging intermediary structure thus being able to pivot upwards or downwards around the rotation axis of the at least one bar.

4. The device according to claim 3, wherein the hanging intermediary structure comprises two handles connected by a connecting central bar and each handle carrying means for attaching a first strap, and a cylindrical bar able to be received within one of the fixed hooks.

5. The device according to claim 1, wherein the fixed structure has a fixed support integral with the ceiling of the vehicle, wherein the retaining means are formed by movable hooks connected to the fixed support so as to be able to pivot around a horizontal pivot axis, the openings of the hooks having bottoms which follow a same imaginary cylinder, and wherein the hanging intermediary structure has at least one cylindrical bar able to be received within the hooks, the hanging intermediary structure thus being able, after engaging the at least one bar within the hooks, to be moved to the use position of the seat by pivoting upwards or downwards the movable hooks.

6. The device according to claim 3, wherein the center of inertia of the hanging intermediary structure, when the at least one bar is engaged within the hooks, is, with respect to the pivot axis of the hanging intermediary structure, offset on the seating part side with respect to the plane of the back in the use position of the seat.

7. The device according to claim 5, wherein the center of inertia of the assembly formed by the movable hooks and the hanging intermediary structure, when the at least one bar is engaged within the hooks, is, with respect to the pivot axis of the assembly formed by the movable hooks and the hanging intermediary structure, offset on the seating part side with respect to the plane of the back in the use position of the seat.

8. The device according to claim 1, wherein the locking means comprise a locking member movable between said first and second positions of the locking means and means for elastically biasing the locking member towards the first position, and wherein the hanging intermediary structure carries a cooperating member arranged to move the locking member from said first position to said second position when the hanging intermediary structure reaches the use position of the seat by a movement towards the ceiling.

9. The device according to claim 8, wherein the locking means comprise an unlocking control handle manually operable to move the locking member from the first position to the second position.

10. The device according to claim 8, wherein the retaining means are formed by fixed hooks having openings which have bottoms which follow a same imaginary cylinder, wherein the hanging intermediary structure has at least one cylindrical bar able to be received within the hooks so as to be rotatable around the longitudinal axis of the at least one bar, the hanging intermediary structure thus being able to pivot upwards or downwards around the rotation axis of the at least one bar, wherein the hanging intermediary structure comprises two handles connected by a connecting central bar and each handle carrying means for attaching a first strap, and a cylindrical bar able to be received within one of the fixed hooks, wherein the cooperating member consists in a locking finger extending from the connecting central bar, and wherein the fixed structure has a notch able to receive the locking finger when the hanging intermediary structure is in the use position of the seat, the locking member being a pivoting latch having an oblique outer surface oriented such that the locking finger pivots the latch to the second position when it presses the oblique surface when the hanging intermediary structure reaches the use position of the seat.

11. The device according to claim 8, wherein the fixed structure has a fixed support integral with the ceiling of the vehicle, wherein the retaining means are formed by movable hooks connected to the fixed support so as to be able to pivot around a horizontal pivot axis, the openings of the hooks having bottoms which follow a same imaginary cylinder, wherein the hanging intermediary structure has at least one cylindrical bar able to be received within the hooks, the hanging intermediary structure thus being able, after engaging the at least one bar within the hooks, to be moved to the use position of the seat by pivoting upwards or downwards the movable hooks, wherein the locking member is formed by a locking finger carried, by the fixed support, so as to be able to translate in a direction parallel to the pivot axis of the movable hooks, and wherein the movable hooks are integrally connected to each other by a connecting central part carrying a leg which is sloped while being oriented upwards and towards the locking finger, a through hole being provided in the leg for letting the locking finger pass, said leg forming the cooperating member and its slope being such that the leg moves the locking finger in translation towards the second position when it presses the sloped leg when the hanging intermediary structure reaches the use position of the seat.

12. A seat assembly for a vehicle, the seat assembly comprising a seat and attachment points for attaching the seat to a ceiling of the vehicle, the seat comprising a seating part, integral with a structure of the vehicle, and a back which is attached, in the use position of the seat, and via at least one first strap, between the seating part and a first high attachment point to a ceiling of the vehicle, said first strap(s) being adjustable in tension and being, in the use position of the seat, tightened so as to maintain in position the back, wherein the seat assembly comprises a device for rapid removal/reinstallation as defined in claim 1.

13. The seat assembly according to claim 12, wherein the seat is provided with a harness comprising at least two shoulder straps, each cooperating with a second strap extending between a low attachment point integral with the structure of the vehicle and, in the use position of the seat, a second high attachment point to the ceiling of the vehicle, said second straps being adjustable in tension and being, in the use position of the seat, tightened so as to allow to maintain the occupant of the seat against the back by both shoulder straps, and wherein the hanging intermediary structure of the device for rapid removal/reinstallation is also provided with means for connecting to said second straps.

\* \* \* \* \*